US008478694B2

(12) United States Patent
Read et al.

(10) Patent No.: US 8,478,694 B2
(45) Date of Patent: Jul. 2, 2013

(54) DIGITAL RIGHTS MANAGEMENT LICENSE ARCHIVING

(75) Inventors: Christopher J. Read, San Diego, CA (US); Robert Hardacker, Escondido, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 1527 days.

(21) Appl. No.: 11/592,649

(22) Filed: Nov. 3, 2006

(65) Prior Publication Data
US 2008/0109368 A1    May 8, 2008

(51) Int. Cl.
*G06F 21/00* (2006.01)
*G06F 7/04* (2006.01)

(52) U.S. Cl.
USPC .............................................. 705/59; 726/26

(58) Field of Classification Search
None
See application file for complete search history.

(56) References Cited

U.S. PATENT DOCUMENTS

| | | | |
|---|---|---|---|
| 6,460,076 B1* | 10/2002 | Srinivasan | 709/219 |
| 6,816,842 B1* | 11/2004 | Singh et al. | 705/59 |
| 2002/0112171 A1* | 8/2002 | Ginter et al. | 713/185 |
| 2002/0161996 A1 | 10/2002 | Koved et al. | 713/150 |
| 2002/0196940 A1 | 12/2002 | Isaacson et al. | 380/227 |
| 2002/0196941 A1 | 12/2002 | Isaacson et al. | 380/231 |
| 2002/0198841 A1 | 12/2002 | Isaacson et al. | 705/51 |
| 2004/0010602 A1 | 1/2004 | Van Vleck et al. | 709/229 |
| 2005/0204019 A1 | 9/2005 | Flynn et al. | 709/219 |
| 2005/0259957 A1* | 11/2005 | Jung et al. | 386/65 |
| 2005/0268346 A1 | 12/2005 | Lee et al. | 726/27 |
| 2006/0085354 A1* | 4/2006 | Hirai | 705/59 |
| 2006/0133241 A1* | 6/2006 | Nakata | 369/47.5 |
| 2006/0242078 A1* | 10/2006 | Evans et al. | 705/59 |

FOREIGN PATENT DOCUMENTS
WO   WO 2005/119677 A1   12/2005

* cited by examiner

*Primary Examiner* — Tsan-Yu J Huang
(74) *Attorney, Agent, or Firm* — Mayer & Williams, P.C.; Karin L. Williams

(57) ABSTRACT

An arrangement is provided where a media server temporarily stores a DRM license that is associated with downloaded media content prior to copying the DRM license to a physical archival medium such as an optical disc. When the media server confirms that the DRM license is successfully copied to the physical archival medium, it destroys the temporarily stored DRM license.

12 Claims, 8 Drawing Sheets

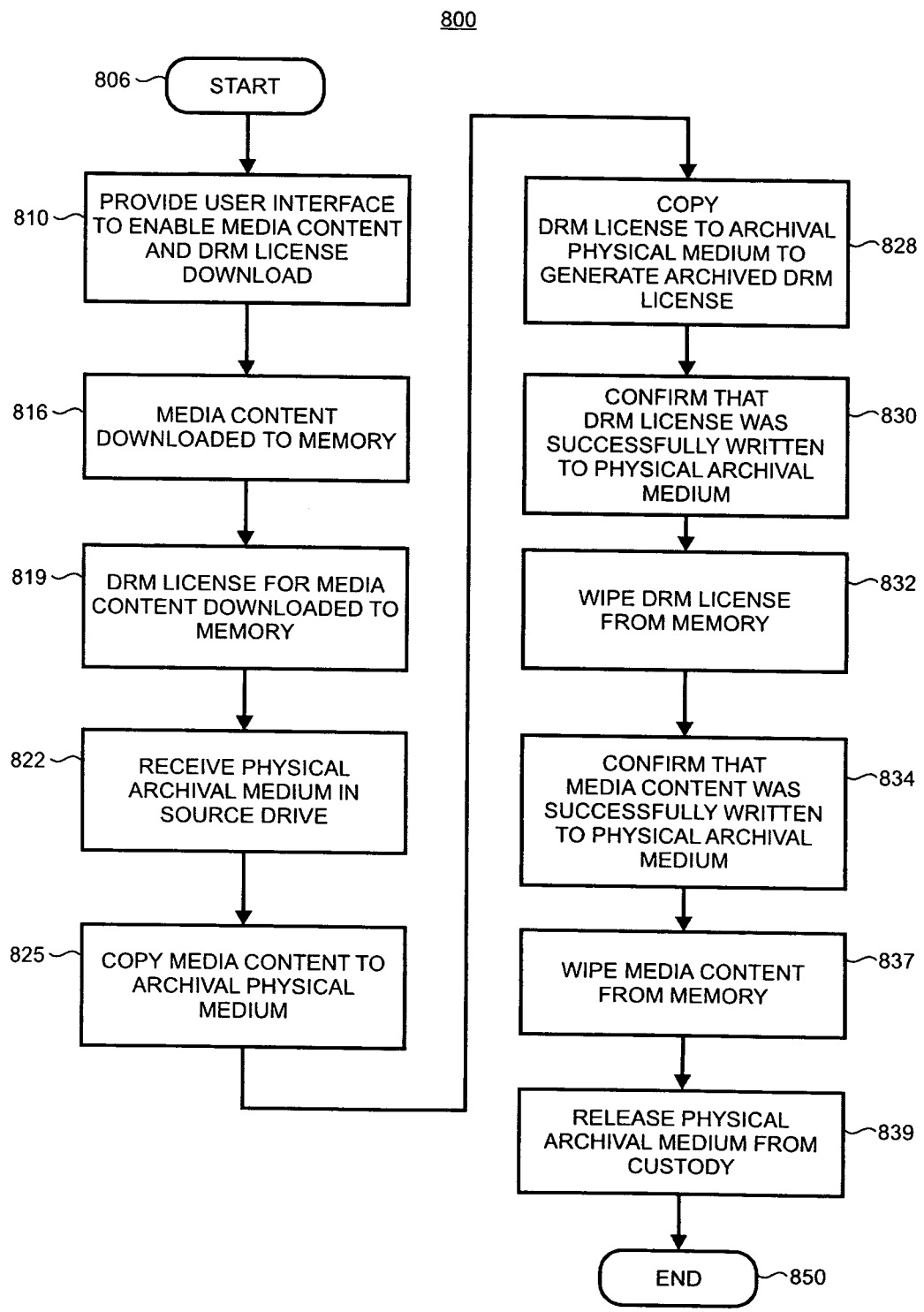

DIGITAL RIGHTS MANAGEMENT LICENSE ARCHIVING

RELATED APPLICATION

This application is related to U.S. patent application Ser. No. 11/592,863 the disclosure of which is incorporated by reference. The related application is commonly assigned.

BACKGROUND

Digital rights management ("DRM") is seeing more widespread use to control access, use, and distribution of digital media content such as software, music, video (e.g., television, music videos and movies) and other digital data. One of the reasons DRM was developed is that digital media content, unlike traditional analog media content, has the potential to be copied over and over without any loss of quality in subsequent copies. In addition, the costs to copy digital media content and distribute it over networks such as the Internet are very small compared with the cost to create the content.

DRM typically enforces some restrictions on the duration of time or number of times a media file may be played on a device, or may limit the number of devices that may be used for playback. Some DRM methodologies, such as those currently used with digital versatile disc ("DVD") limit use of the media content to playback only, without authorization or enablement for copies to be made. DRM is also being used with some media content on compact disc ("CD") as well. Whatever particular rights or limits are provided, DRM generally enables digital media content providers to protect and manage their investments in creating the content. Such protection and management is often viewed as being reasonably necessary to ensure that a wide variety of high quality media content continues to be available to consumers.

The U.S. Digital Millennium Copyright Act of 1998 made it illegal to circumvent DRM and other methods used to protect the copyright of media content. Other countries have since adopted similar provisions under the requirements of an international treaty sponsored by the World Intellectual Property Organization. Recent court decisions have also confirmed that unauthorized sharing or downloading of proprietary media content using peer-to-peer file-sharing software violates the content provider's rights in protecting its creations. Thus, DRM has developed a solid legal footing in addition to its support from digital content creators and providers.

Consumers have generally accepted DRM and continue to purchase digital media content, such as music downloaded from Internet stores, that include DRM use restrictions. However, consumer reaction is more favorable and DRM techniques less apt to be purposefully circumvented when DRM restrictions are perceived as being fair and unobtrusive. That is, consumers appear to be more willing to accept DRM and are less likely to illegally acquire or share digital media content when legal use is simple and straightforward and meets the consumer's expectations of fairness. Thus, a goal for many DRM techniques is to make the implementation of DRM as transparent to the user as possible so that legal use of the media content is simply enabled with little or no awareness by the consumer that DRM is present or being implemented.

Some current DRM schemes include storing a DRM license for downloaded media content on a device such as a personal computer ("PC") or server. PCs are commonly used as proxy devices that facilitate the downloading of the media content, as well as the copying or transferring of the media content to portable media players such as music players, mobile phones, handheld game devices and the like.

While such DRM schemes can often perform satisfactorily, storing a DRM license or media content on a PC's hard disk drive ("HDD") can be problematic in some situations. In addition, having the DRM licenses or media content tied to the PC may present problems to a user looking to replace a failed PC or upgrade to a new model. Some users may regard the awareness of DRM that must be maintained when using a PC as a proxy to be a burden which interferes with access to the media content. In addition, hard disk crashes and other system failures are not uncommon with even new or well maintained PCs. Unfortunately, users risk losing the media content, or the DRM licenses needed to play the content, when a system failure occurs or the hard drive crashes. Even if the HDD is backed up, restoring DRM protected media content can often be tricky and not all DRM licenses from all sources are configured to be restorable from a backup source. Users may be required to contact the download provider or vendor to replace the media content in such cases. This can cause additional problems for the user, for example, in cases where the original media content is no longer available.

SUMMARY

An arrangement is provided where a media server such as a computer or server temporarily stores a DRM license that is associated with downloaded media content prior to copying the DRM license to a physical archival medium such as an optical disc or memory card. When the media server confirms that the DRM license is successfully copied to the physical archival medium, it destroys the temporarily stored DRM license.

In an illustrative example, the root DRM license for downloaded media content is written from a media server (where it is temporarily stored) to an optical disc such as a CD, DVD, or high-definition DVD (e.g., Blu-ray disc, HD-DVD disc) which is utilized as the physical archival medium. The downloaded content is also written to the optical disc. The media server then confirms the successful copying of the DRM license and media content to the optical disc before wiping (i.e., erasing) the DRM license from its memory, typically an HDD. The present DRM archival arrangement advantageously enables the creation of an optical disc with the transferred media content and associated DRM license that is bound to the disc. Accordingly, the optical disc can then be used as if it were a traditionally retailed media product such as a movie DVD or music CD. The optical disc may be played on the media server or removed and played on other electronic devices in other locations in a conventional manner. Removable media such as flash memory cards are also usable in this present DRM licensing archival arrangement.

In another illustrative example, custody of the optical disc by the media server enables a paradigm in which the media server can presume that the media content contained on the optical disc is properly acquired and/or owned (i.e., in conformance with applicable DRM usage rules). Accordingly, the media server is enabled with a capability to transfer copies of the media content to other devices with limited playback rights (e.g., limited in terms of playback count, playback time, reduced quality or reduced resolution, etc.). Such devices may be selected from a variety of standalone, portable or networked electronic devices. The transferred copies are typically arranged as "Copy Never" so that subsequent copies may not be made from the media content transferred from the optical disc to the other devices.

While many existing DRM schemes work very well, the present arrangement beneficially addresses the potential loss of media content due to HDD or other system failures. It further strikes an advantageous balance between protecting content creators' rights and investment and providing consumers with an easy way to use DRM-protected media content. As the present DRM paradigm relies on the physical custody of media content as an enabler of usage rights, the expectations of consumers—who traditionally equate possession of an object with the right to use it—are better satisfied. In addition, it is anticipated that consumers will be more willing to accept the present DRM license paradigm because it operates transparently and makes using DRM-protected media content easy and convenient.

BRIEF DESCRIPTION OF THE DRAWING

FIG. 8 is a flowchart of an illustrative method for archiving a DRM license using an electronic device.

DETAILED DESCRIPTION

Figure 1:
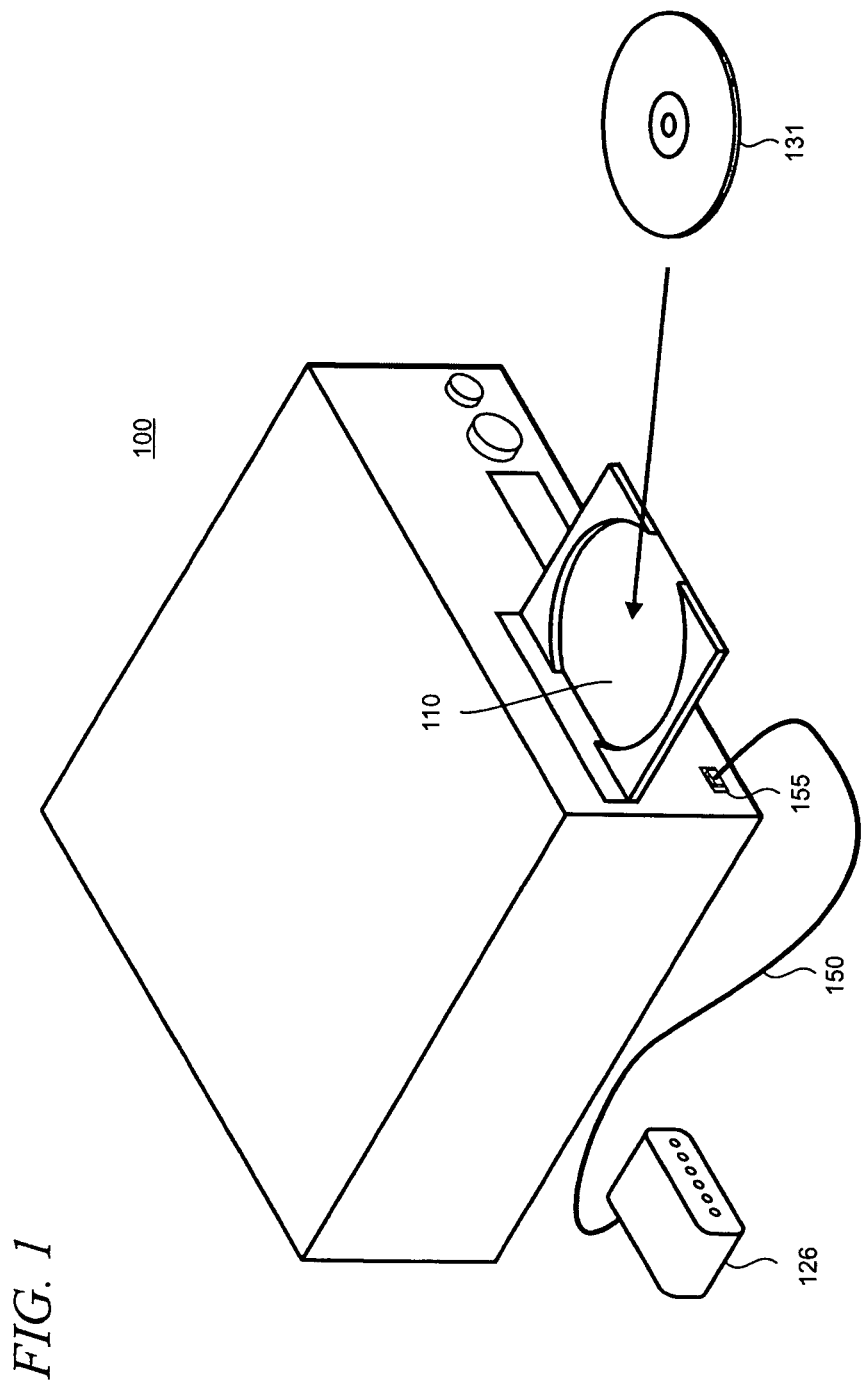
FIG. 1 is a pictorial view of an illustrative DRM license archiving arrangement showing a media server with an optical disc drive and removable storage media drive that are each usable to write data to a physical archiving medium, and a network gateway.

FIG. 1 is a pictorial view of an illustrative DRM license archiving arrangement showing a media server 100 that includes an optical disc drive 110. Media server 100 may be arranged using a variety of devices including PCs, jukeboxes, servers and other electronics device that are capable of receiving and rendering media content. Media server 100 includes a network interface 155 that is coupled to a network hub or gateway 126 with a cable 150 such as an Ethernet cable. Network interface 155 is typically configured as a broadband or high bandwidth connection such as 10 or 100 MB Ethernet connection. In alternative arrangements, a wireless arrangement (not shown), such as one conforming to IEEE 802.11x (Institute of Electrical and Electronics Engineers), is used for the link between the media server 100 and the gateway 126.

Network gateway 126 may be arranged from a DSL (digital subscriber line) or cable modem, hub, switch, or router, for example, to provide connectivity to an external network such as the Internet. Network gateway 126 enables a user of media server 100 to select and download media content from remote sources, for example, from media content providers over the Internet.

Media server 100 is arranged to receive custody of a physical archival medium 131 as shown in FIG. 1. In this illustrative example, physical archival medium 131 is embodied in an optical disc storage medium such as a CD or DVD. Alternative optical storage formats include HD-DVD, Blu-Ray, hybrid DVD, Enhanced Versatile Disc, and optical holographic disc. In this illustrative example media content 131 is held in custody in the single optical disc drive 110 disposed in media server 100. However, any of a variety of different storage formats, holding arrangements, and a number of discrete physical archival media are also usable depending on the requirements of a specific application.

Use of the physical archival medium 131 to tangibly embody rights into something that a user can see and touch is a fundamental principle which underlies the present DRM license archival paradigm. Under such paradigm, rights are granted to the holder of the medium by the associated DRM licenses that are bound to it as described below in detail in the text accompanying FIG. 4. By transferring downloaded media content and DRM license to a robust medium such as an optical disc, the risk of content loss due to hard disk crash or system failure is eliminated. And as noted above, the expectations of users are better satisfied because the traditional model—where possession of an object is equated with the right to use it—is maintained.

Figure 2:
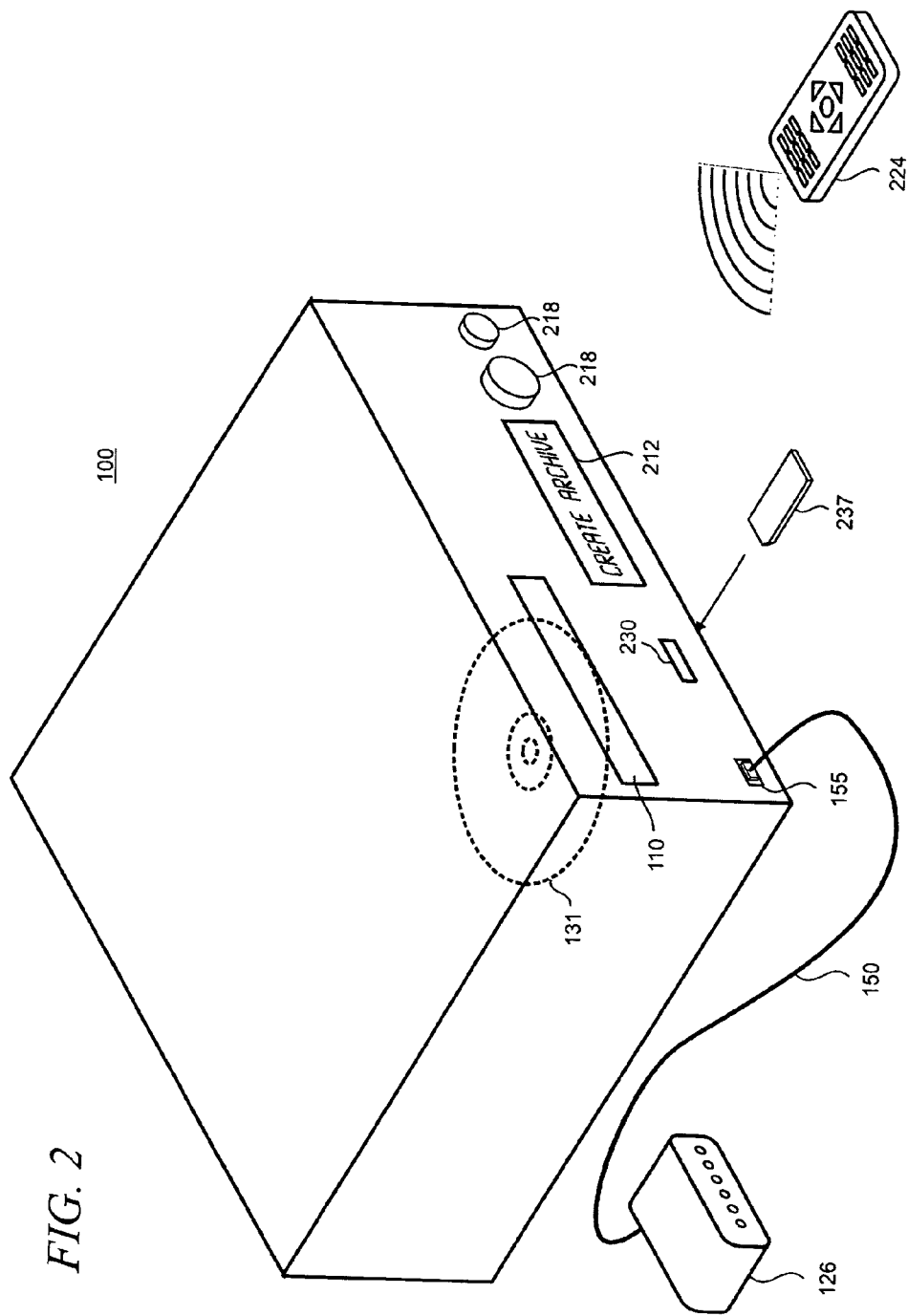
FIG. 2 is a pictorial view of an illustrative DRM license archiving arrangement showing details of the media server shown in FIG. 1.

FIG. 2 shows details of the illustrative media server 100 shown in FIG. 1. Media server 100 includes a visual display 212 and controls 218 that may be used by a user to effectuate selection and control of various operating features of media server 100. Alternatively, a remote control device 224 is commonly utilized to provide additional selection and control features. In alternative arrangements, media server 100 is configured with interfaces (not shown) to external input devices such as a keyboard, and/or an external display device such as a monitor.

Media server 100 is equipped with a removable storage media drive 230 that is arranged to read from and write to a removable storage medium 237. Removable storage media 237 is utilizable as an alternative physical archival medium and is typically selected from one or more of the variety of currently available flash memory cards such as Memory Stick, CompactFlash and SD (Secure Digital) cards. Such flash memory cards are small but are capable of storing large amounts of digital media content, often in the multiple gigabyte range. Removable storage media 237 is used, in some applications as described below, as an alternative storage and distribution form to the optical disc shown in FIG. 1.

Figure 3:
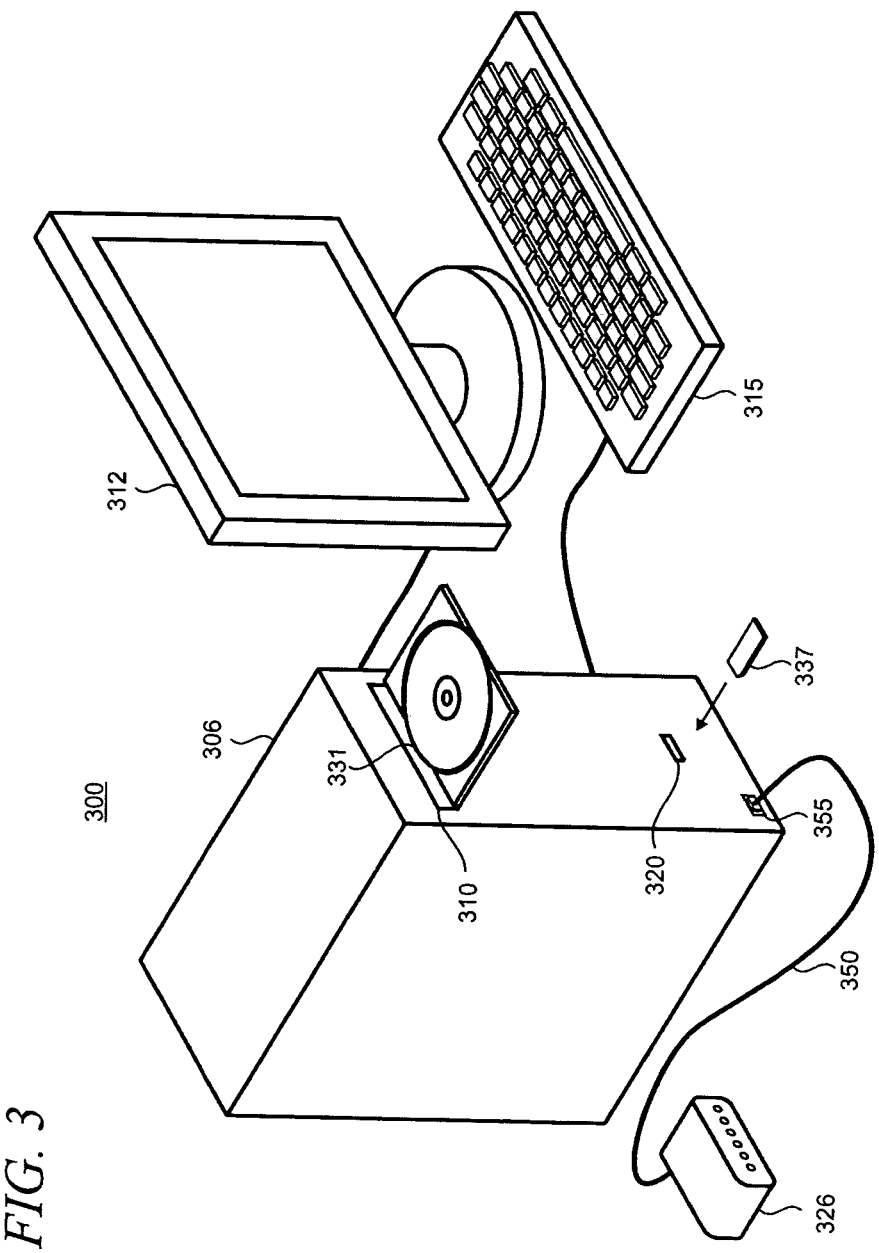
FIG. 3 is a pictorial view of an illustrative DRM license archiving arrangement showing a tower-type media server or PC with an optical disc drive and removable storage media drive that are each usable to write data to a physical archiving medium, along with a monitor, keyboard and network gateway.

FIG. 3 is a pictorial view of an illustrative DRM license archiving arrangement showing a tower-type media server or PC 300 with monitor 312 and keyboard 315. The processing unit 306 of PC 300 includes a network interface 355 that is coupled via cable 350 to network gateway 326. Network interface 355, cable 350 and network gateway 326 may be arranged in a similar manner as those elements shown in FIG. 1 and described in the accompanying text. PC 300 is accordingly usable to facilitate the selection and downloading and temporary storage of online media content from a network. The processing unit 306 is further configured with an optical drive 310 and a removable storage media drive 320 that are arranged, respectively, to interface with an optical disc 331 and removable medium 337. Each is alternatively used as physical archival medium in accordance with the invention.

Figure 4:
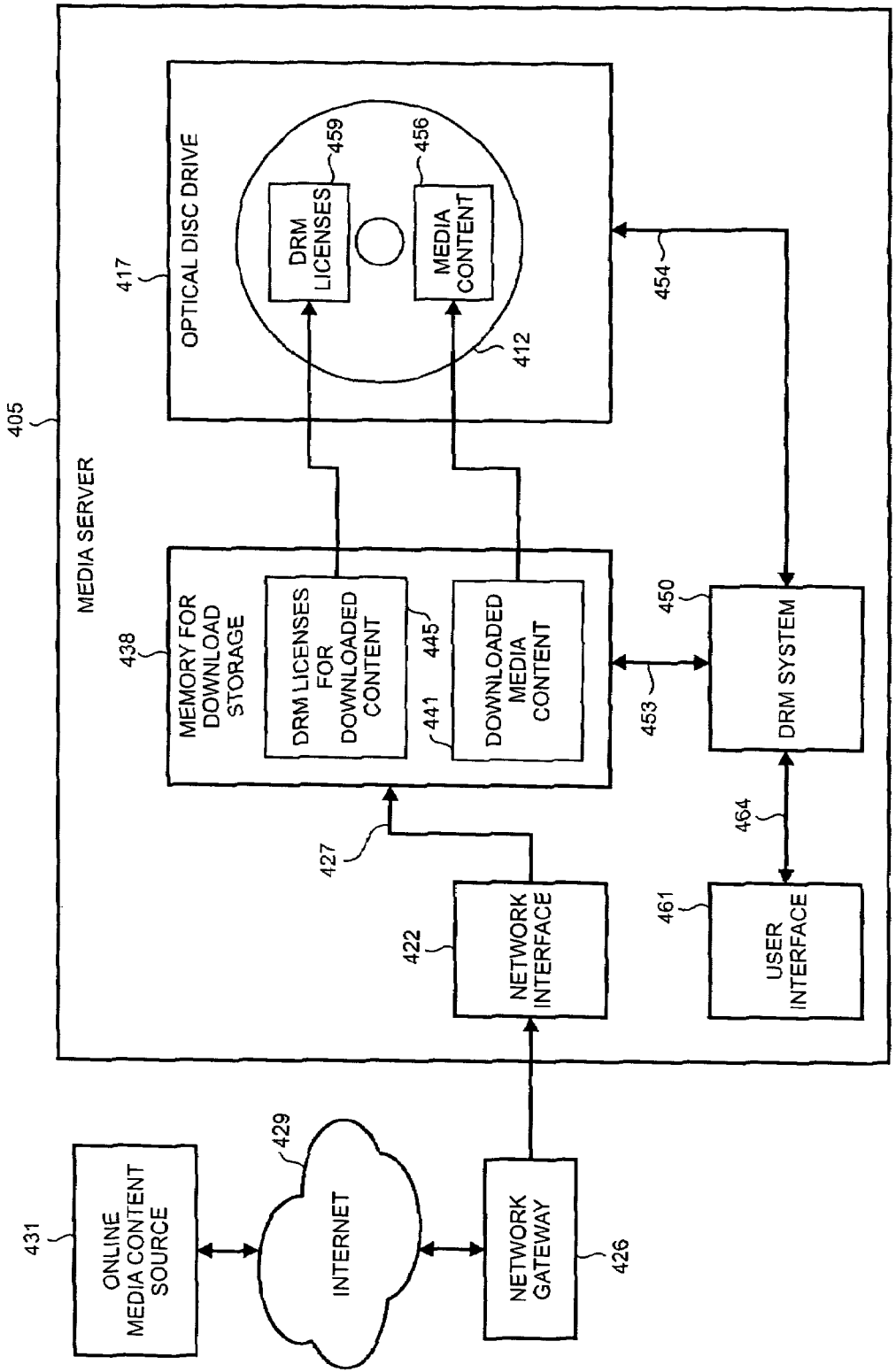
FIG. 4 is a functional block diagram of an illustrative media server using a physical archival medium that is embodied in an optical disc.

FIG. 4 is a functional block diagram of an illustrative media server 405 using a physical archival medium that is embodied in an optical disk 412 that is held in custody in an optical disk drive 417 in media server 405. Media server 405 may be arranged as a consumer electronic device similar to that shown in FIG. 1, or alternatively as a PC or media center-type PC like that shown in FIG. 3, for example.

Media server 405 is coupled via a network interface 422 to a network gateway 426 which is, in turn, coupled to an external network such as Internet 429 and a remote online media content source 431. Network interface 422 and network gateway 426 may be configured in a similar manner to the corresponding elements shown in FIG. 1 and described in the accompanying text. Accordingly, a user of media server 405 is enabled with access to media content and associated DRM licenses that may be downloaded.

Network interface 422 is coupled with line 427 to a memory 438 that is arranged to temporarily store the media content 441 and associated DRM licenses 445 downloaded from online media content source 431. Memory 438 is typically configured from random access memory ("RAM") or using an HDD.

A DRM system 450 is operatively coupled using line 453 to memory 438. DRM system 450 is further operatively coupled with line 454 to optical disc drive 417. DRM system 450 is arranged to control the transfer of copies of the media content 441 and the associated DRM licenses 445 to the physical archival medium which, in this illustrative example, is optical disc 412. In particular, DRM system 450 controls the transfer of media content 456 on to optical disc 412 as a copy of the media content 441 that is temporarily stored on memory 438. Similarly, DRM system 450 controls the transfer of DRM licenses 459 on to optical disc 412 as a copy of the DRM licenses 445 that are temporarily stored on memory 438. Upon verification of successful completion of the transfer process, DRM system 450 is further arranged to control the permanent erasure of DRM licenses 445 from memory 438. DRM system 450 is further optionally arranged to control the permanent erasure of the media content 441 from memory 438 in some applications.

The transfer process is arranged to ensure that the transferred DRM licenses are locked to a particular instance of a physical archival medium. Each discrete example of a particular physical archival media type (for example, Blu-ray optical disc) may be configured to include an ID, code, key or serial number that uniquely identifies it. Such unique identification may comprise, for example, a number sequence or an alphanumeric expression. In addition, the unique identification is permanent because it is not capable of being modified.

Use of the unique identification feature enables, for example, the media content 441 to be copied onto the physical archival media using an encoding/encryption methodology that uses the serial number as a key or seed or as a component of such serial number or key. The serial number is subsequently read from the disk and used by a media player's resident DRM system to decode or de-encrypt and render the media content. Thus the use of the unique and non-modifiable disk identification ensures that the transferred DRM license is bound to a specific piece of physical archival media.

In some applications of DRM license archiving, it is contemplated that it may be desirable to enable the physical archival media that holds the DRM licenses to be changed from one physical media type to another so long as certain conditions can be met. For example, the target medium may be first selected as a removable storage medium (e.g., removable storage medium 237 or 337 in FIGS. 2 and 3, respectively) where media content and DRM licenses are then transferred and bound to it. At some later time, the media content and DRM license may be transferred to a second piece of physical media such as an optical disc, for example, by using both the optical and removable storage media drives of media servers 100 and 300 shown in FIGS. 1-3. However, such transfer between media types is permitted under the present arrangement only when certain criteria are satisfied, namely that the first media type is erasable or rewritable, and the second media type supports the use of DRM. The first media type is required to be permanently erased to prevent the proliferation of copies of the media content and DRM licenses. The second media type is required to support DRM so that any limitations and/or restrictions imposed by the DRM licenses bound to the first media type are preserved intact after being transferred to the second media type.

Accordingly, in many applications it is contemplated that transfer of physically archived media content and associated DRM licenses may be performed, for example, from a memory card (e.g., Memory Stick) to an optical disc (e.g., Blu-ray) since the transfer criteria are met. However, the reverse situation (transfer from optical disc to memory card) might not be permissible since not all optical disc types are erasable.

A user interface 461 is operatively coupled to DRM system 450 via line 464 to enable user control over the archival process. However, it is emphasized that in most applications it is desirable for the DRM license archival process to be as transparent to the user as possible. Thus, for example, user interface 461 may be arranged to provide the user with a prompt to insert an optical disc into the optical disc drive to enable the transfer of the media content and associated DRM licenses to the physical archival medium when new media content is downloaded. User interface 461 is further beneficially arranged, in some applications of the invention, to enable a user to browse, select, and download media content from the online media content source 431.

Figure 5:
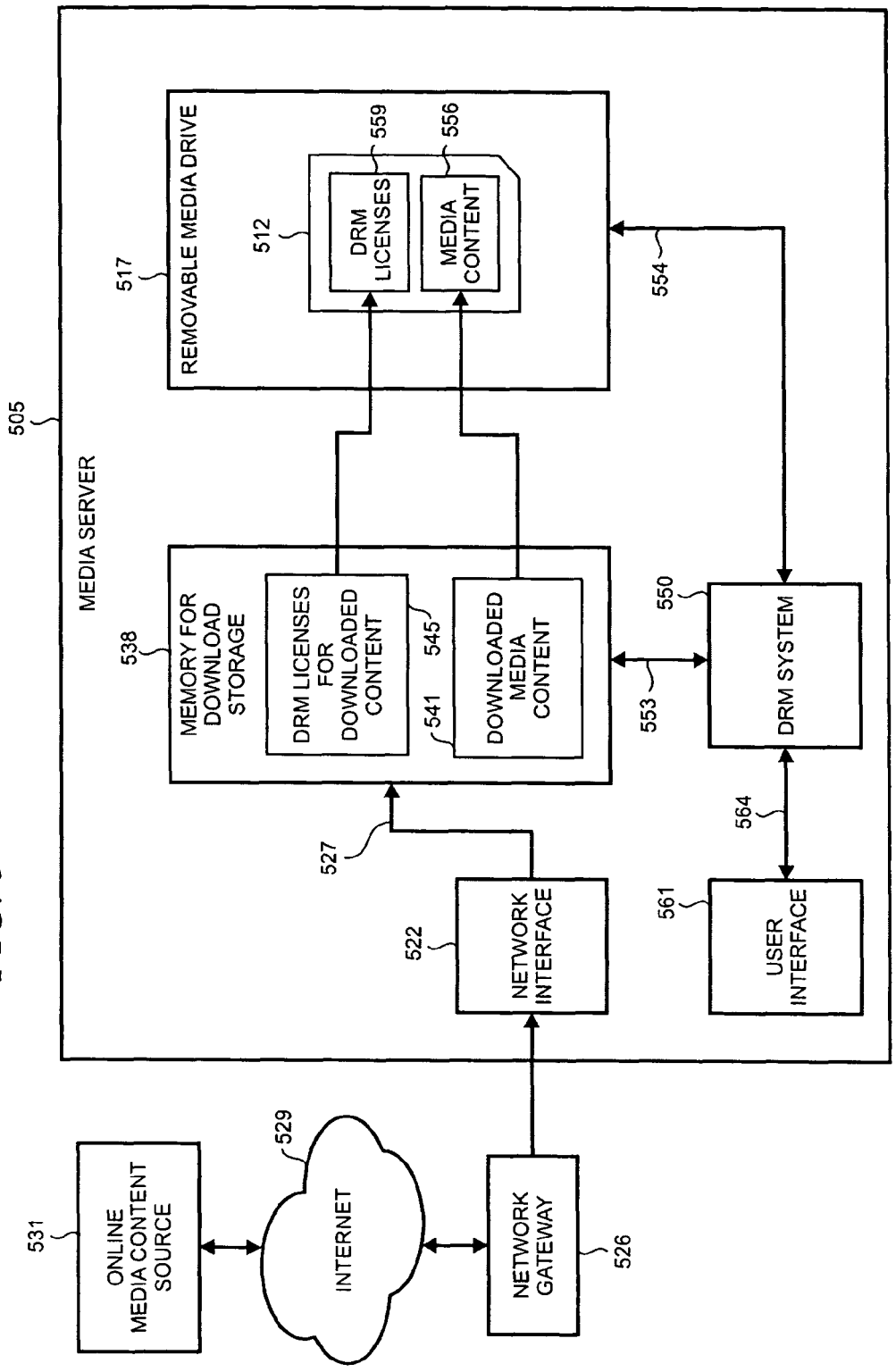
FIG. 5 is a functional block diagram of an illustrative media server using a physical archival medium that is embodied in a memory card.

FIG. 5 is a functional block diagram of an illustrative media server 505 using a physical archival medium that is embodied in removable storage medium 512 that is held in custody in a removable storage drive 517 in media server 505. Media server 505 may be arranged as a consumer electronic device similar to that shown in FIG. 1, or alternatively as a PC or media center-type PC like that shown in FIG. 3, for example.

Media server 505 is coupled via a network interface 522 to a network gateway 526 which is, in turn, coupled to an external network such as Internet 529 to a remote online media content source 531. Network interface 522 and network gateway 526 may be configured in a similar manner to the corresponding elements shown in FIG. 1 and described in the accompanying text. Accordingly, a user of media server 505 is enabled with access to media content and associated DRM licenses that may be downloaded to the media server 505.

Network interface 522 is coupled with line 527 to a memory 538 that is arranged to temporarily store the media content 541 and associated DRM licenses 545 downloaded from online media content source 531. Memory 538 is typically configured from RAM or using an HDD.

A DRM system 550 is operatively coupled with line 553 to memory 538. DRM system 550 is further operatively coupled with line 554 to optical disc drive 517. DRM system 550 is arranged to control the transfer of copies of the media content 541 and the associated DRM licenses 545 to the physical archival medium which, in this illustrative example, is removable storage medium 512. In particular, DRM system 550 controls the transfer of media content 556 on to removable storage medium 512 as a copy of the media content 541 that is temporarily stored on memory 538. Similarly, DRM system 550 controls the transfer of DRM licenses 559 on to removable storage medium 512 as a copy of the DRM licenses 545 that are temporarily stored on memory 538. Upon verification of successful completion of the transfer process, DRM system 550 is further arranged to control the permanent erasure of DRM licenses 545 from memory 538. DRM system 550 is further optionally arranged to control the permanent erasure of the media content 541 from memory 538 in some applications.

A user interface 561 is operatively coupled to DRM system 550 via line 564 to enable user interaction with the present archival process. User interface 561 may be arranged in a similar manner as user interface 461 shown in FIG. 4 and described in the accompanying text.

Figure 6:
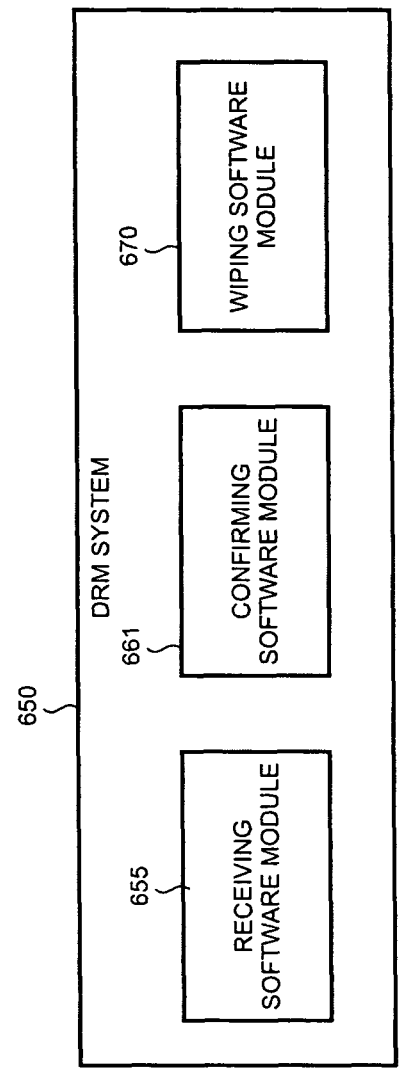
FIG. 6 is block diagram of an illustrative DRM system.

FIG. 6 is a block diagram of an illustrative DRM system 650. DRM system 650 is arranged with similar features and functions as DRM system 450 in FIG. 4 and DRM system 550 in FIG. 5. DRM system 650 is typically implemented in software that operates on a media server or PC and includes three software modules: a receiving software module 655; a confirming software module 661; and a wiping software module 670. The receiving software module 655 is arranged to enable DRM system 650 to monitor and confirm the successful downloading to a temporary storage (e.g., RAM or an HDD) of a DRM license associated with downloaded media content.

The confirming software module 661 in DRM system 650 is arranged to confirm that the DRM license is successfully copied to a physical archiving medium such as an optical disc or removable storage medium. By "successful" it is meant that the copy of the DRM license is written in a way that it can be subsequently read from the physical archival medium without substantial errors that would corrupt the integrity of the DRM license.

The wiping software module 670 in DRM system 650 is arranged to wipe the DRM license written to storage so that the DRM written to storage is not restorable in any way after confirming that the DRM license is successfully copied to the physical archiving medium. Such wiping thereby permanently erases the DRM license from the temporary storage location such as RAM or an HDD.

Figure 7:
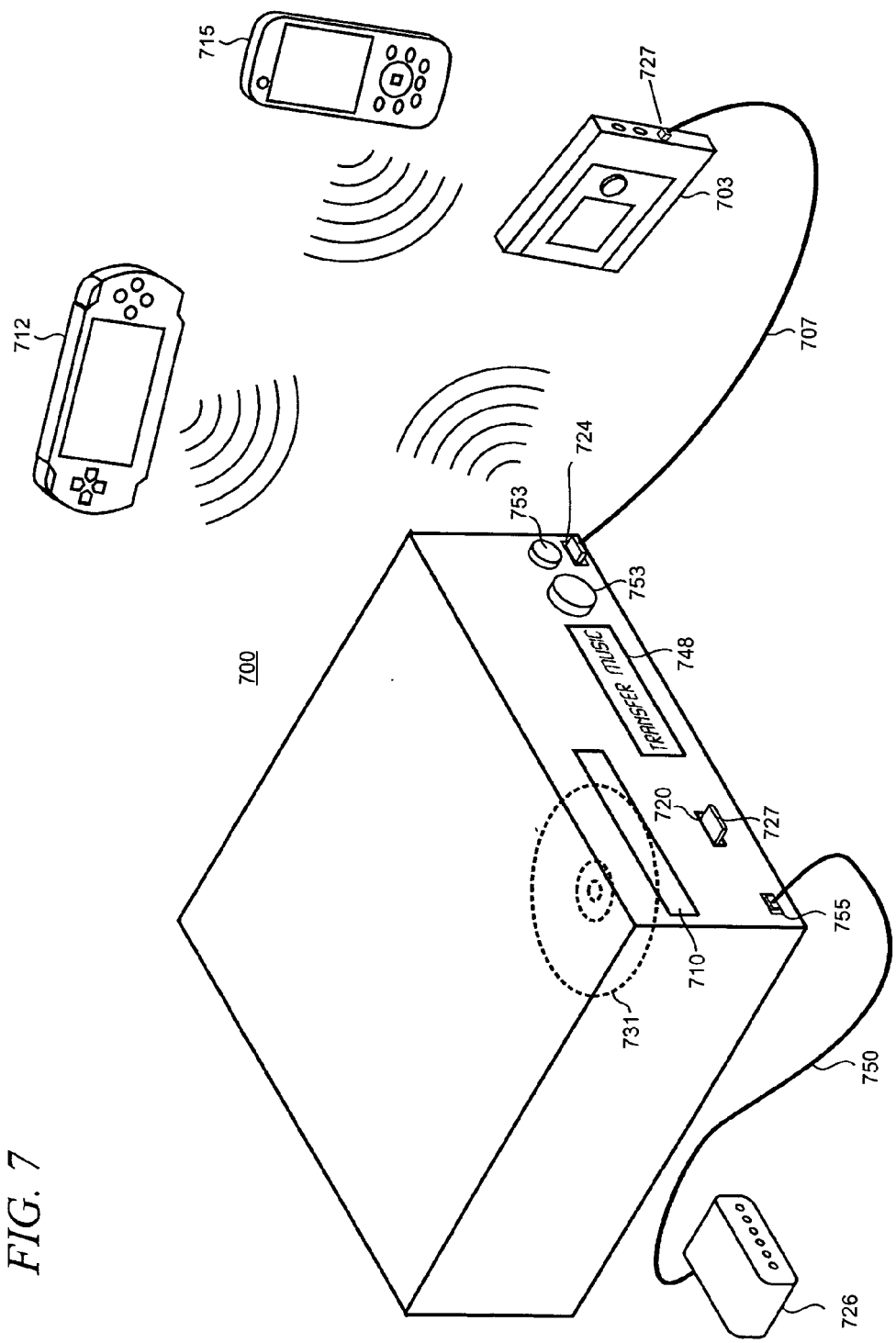
FIG. 7 is a pictorial view of an illustrative DRM license archiving arrangement showing a media server, two portable media devices in wireless communication with the media server, and a portable player coupled to the media server with a communications cable.

FIG. 7 is a pictorial view of an illustrative DRM license archiving arrangement showing a media server 700, a portable media player 703 coupled to the media server 700 with a communications cable 707 and two portable media devices 712 and 715 in wireless communication with the media server 700.

Media server 700, in this illustrative example, is arranged in a similar manner to media server 100 shown in FIGS. 1 and 2 and described in the accompanying text. Media server 700 has custody of physical archival media in the form of an optical disc 731 which is disposed in optical disc drive 710. Media server 700 further has custody of physical archival media in the form of removable storage medium 727 that is disposed in removable storage medium drive 720.

In this illustrative example, both physical archival media include downloaded media content and associated DRM licenses that are bound to the media using the inventive principles described above.

Media server 700 is coupled to a network gateway 726 with a cable 750 that is coupled to a network interface 755. Media server 700 further includes a visual display 748 and controls 753. All such elements are similar in form and function to those shown in FIG. 1 and described in the accompanying text.

Portable media player 703 is typically configured to have features selected from the wide variety of devices that are available which are capable of receiving media content, typically in digital form, and play or otherwise use the media content under the direction of a user. Portable media player 703 is generally light and compact and operates on batteries (which are either replaceable or rechargeable in most cases). Depending on the requirements of an application, portable media player 703 may incorporate the features provided, for example, by audio players, video players, pocket PCs (personal computers), mobile phones, smartphones, personal digital assistants (PDAs), handheld game consoles, laptop PCs, and other devices having similar features or functions.

Cable 707, in this illustrative example, is a USB (universal serial bus) cable that is coupled between respective USB ports 724 and 727 in the media server 700 and portable media player 703. In other applications of DRM license archiving, other cable types and associated communication protocols may be used including serial, IEEE-1394 or "FireWire", parallel, small computer system interface ("SCSI") and the like. USB ports 724 and 727 are typically arranged as high speed communications ports in conformance with the USB 2.0 Specification.

Media server 700 is further equipped with a wireless transceiver (not shown) which is arranged to provide a communications path with wireless devices. In this illustrative example, media server 700 uses a Wi-Fi communications protocol conforming to IEEE 802.11x. Alternative communication protocols include Bluetooth, ZigBee, and wireless USB, for example.

Portable device 712 is configured as a portable game console and is another example of a device that is usable with the present DRM license archiving arrangement. Portable device 712 is capable of playing music and video files as a supplement to its game playing functionality.

Portable media device 715 is configured with mobile phone functionality and is another example of a device that may be used with the present DRM license archiving arrangement. Portable device 715, equipped with audio and/or video and image processing capability, exemplifies the current generation of mobile phones which can play music, display video clips, and show pictures in addition to providing regular mobile telephone functions to the user.

Since media server 700 has custody of physical archival media in the form of optical disc 710 and removable storage medium 727, in accordance with the present invention, the media server may be enabled to transfer temporary "Copy Never" DRM licenses (and the associated media content) to the portable devices 703, 712 and 715 when such devices are placed in operative communication with media server 700 as shown in FIG. 7.

The temporarily transferred media content and DRM licenses are typically configured to include restrictions on use and/or rendering by the portable devices. For example, a transferred DRM license may sets rights and limits for the associated media content. Such rights typically include limited playback of the media or the imposition of playback at a reduced level of quality or resolution.

The limitations of playback include, for example, time limited playback and limited play count. That is, the temporary DRM license copied to one of the portable devices 703, 712 and 715 may be configured to specify start times, end times, and license duration limits for the transferred media content. In addition, the temporary DRM license may be set to support counted operations on the portable device which specifies the number of times that a particular piece of media content can be played back.

The reduction in quality or resolution may be implemented, for example, by transferring audio-type media content in a compressed (i.e., lossy) MP3 (Moving Pictures Expert Group Audio Layer 3) format from an original uncompressed CD (i.e., "Red Book") format. Here, MP3 audio is typically encoded at bit rates between 128 and 320 kbits/second which provides for a reduction in audio quality when compared to uncompressed CD-quality audio which has a bit rate greater than 1411 kbits/second. Similarly, for transferred video-type media content, the transferred media content may be reduced in resolution, for example, from High Definition video having a line resolution of 720p, 1080i or 1080p (where "p" denotes progressive scanning and "i" denotes interlaced scanning) to standard definition video having a resolution of 480i or below, or to CIF (Common Intermediate Format) having an image size of 352×288 pixels.

As noted above, the temporary DRM license is a "Copy Never" license which thereby restricts the subsequent transfer of media content and/or the associated DRM license from a portable device 703, 712 and 715 to another portable device. In alternative arrangements, the media content may be subsequently transferable, but the temporary DRM license is not. In such an alternative arrangement, a new and different DRM license would need to be obtained by the other portable device to enable the subsequently transferred media content to be used.

FIG. 8 is a flowchart of an illustrative method 800 for archiving a DRM license using an electronic device such as a media server or PC. The method starts at block 806. At block 810, the media server or PC is used to provide a user interface that is utilized by a user to browse, select and download media content and associated DRM licenses from an online source. The downloaded media content and DRM licenses are written to a memory as indicated in blocks 816 and 819, respectively. In an alternative arrangement, the downloaded media content may be supplemented or replaced by media content that is obtained from one or more local sources that physically embodies the media content such as a hard disk drive, RAM-disk, RAM-drive, flash memory card, optical disc, or magnetic medium. The media content obtained from the one or more local sources is then also written to the memory.

At block 822, the media server or PC receives a physical archival medium such as an optical disc or removable storage medium in a corresponding drive. In some applications, a prompt may be generated and displayed to assist a user with this step. As noted above, a DRM system, such as DRM system 650 in FIG. 6, is typically used to facilitate the archiving process.

At block 825, the media server or PC, typically under the control of a DRM system, copies the media content from the memory to the physical archival medium. At block 828 in FIG. 8, the media server or PC copies the DRM licenses associated with the downloaded media content from the memory to the physical archival medium to thereby create the archived DRM license.

The media server or PC, under control of the DRM system, confirms the successful copying of the DRM license from memory to the physical archival medium in block 830. If so confirmed, then the DRM license is wiped from the memory at block 832.

At block 834, the media server or PC, under control of the DRM system, confirms the successful copying of the associated media content from memory to the physical archival medium. If so confirmed, then the media content is wiped from the memory at block 837. It is noted that the step shown in block 837 is optional as it may not be desirable to expend resources to wipe the media content from the memory as the erasure of the associated DRM license from memory is commonly sufficient to render the media content in the memory unusable.

Once it has been confirmed that the DRM license archival is successfully completed, the media server or PC can release the physical archival medium from its drive to the user as indicated by block 839. The user can then use and enjoy the downloaded media content in a similar manner to that purchased or rented on conventional media such as retail CDs or DVDs. The illustrative method 800 ends at block 850.

What has been described above includes illustrative examples of the present digital rights management license archiving. It is, of course, not possible to describe every conceivable combination of components or methodologies, but one of ordinary skill in the art may recognize that many further combinations and permutations are possible. Accordingly, the illustrative examples are intended to embrace all such alterations, modifications, and variations that fall within the spirit and scope of the appended claims.

In particular and in regard to the various functions performed by the above described methods, components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the illustrative examples provided herein. In this regard, it will also be recognized that the illustrative examples include a system as well as a computer-readable medium having computer-executable instructions for performing the acts and/or events of the various methods.

In addition, while a particular feature of the illustrative examples may have been disclosed with respect to only one of several implementations, such feature may be combined with one or more other features of the other implementations as may be desired and advantageous for any given or particular application or setting. Furthermore, to the extent that the terms "includes" and "including" and variants thereof are used in either the detailed description or the claims, these terms are intended to be inclusive in a manner similar to the term "comprising."

Other features of the invention are contained in the claims that follow.

What is claimed is:

1. A system comprising:
   one or more processors in an electronic device;
   a memory, the memory including computer-executable instructions which, when executed by the one or more processors in an electronic device, cause the one or more processors in an electronic device to perform the steps of:
   confirming receipt of a DRM license associated with downloaded media content at a temporary storage location, the temporary storage location within a server as part of a Hard Disk Drive (HDD) of the electronic device;
   confirming that the DRM license is copied to a removable physical archiving medium; and
   wiping the DRM license written to the temporary storage location so that the DRM license written to the temporary storage location is not restorable in any way, after confirming that the DRM license is copied to the removable physical archiving medium, to thereby permanently erase the DRM license from the temporary storage location.

2. The system of claim 1 further including
   the memory, the memory including additional computer-executable instructions which, when executed by the one or more processors in an electronic device, cause the one or more processors in an electronic device to perform the steps of:

monitoring custody of the removable physical archiving medium and for invoking transfer of a temporary DRM license to an external device responsively to the monitoring.

3. The system of claim 2 in which the temporary DRM license comprises a copy-never DRM license.

4. The system of claim 2 in which the temporary DRM license provides limits on use by the external device of media content contained on the removable physical archiving medium, such limits selected from one of restricting playback of the media content to a pre-defined playback count, restricting playback of the media content to a pre-defined playback duration, restricting subsequent copying of the media content from the external device, or imposing a restriction on quality of playback of the media content.

5. The system of claim 2 in which the external device is a portable media player selected from one of music player, multimedia player, mobile phone, PDA, pocket PC, or handheld game device.

6. The system of claim 1 in which the wiping step invokes a method for shredding the DRM license copied to storage, the invoked method selected from one of permanently erasing the copied DRM license or overwriting the copied DRM license.

7. A media server, comprising:
an input coupleable to a network for receiving downloaded media content and an associated DRM license;
a memory for storing the downloaded media content and the associated DRM license;
a removable physical archival storage system; and
one or more non-transitory computer-readable medium containing instruction which, when executed by one or more processor disposed in the media server perform a method comprising the steps of a) controlling copying of the associated DRM license from the memory to the removable physical archival storage system, and b) controlling permanent erasure of the DRM license from the memory upon confirming that the copying is completed.

8. The media server of claim 7 that is integrated in one of personal computer, file server, jukebox, media server, or media player.

9. The media server of claim 7 in which the memory is selected from one of hard disk drive, flash RAM, RAM-disk, re-writable optical storage or RAM-drive.

10. The media server of claim 7 in which the memory comprises a cache implemented in one of non-volatile memory or protected memory.

11. The media server of claim 7 in which the archival storage system comprises an optical disc drive arranged to write data to an optical disc selected from one of CD, CD-R, CD-RW, DVD, high definition DVD, HD-DVD, Blu-ray disc, Enhanced Versatile Disk, Digital Multilayer Disk, Forward Versatile Disk, holographic disk, Versatile Multilayer Disk, DVD-R, DVD+R, DVD-RW, DVD+RW or DVD-RAM.

12. The media server of claim 7 in which the archival storage system comprises a Flash memory card interface selected from one of USB (Universal Serial Bus), Memory Stick or Flash memory card reader.

* * * * *